United States Patent [19]

Muryoi

[11] 4,439,031
[45] Mar. 27, 1984

[54] DIAPHRAGM DRIVING DEVICE FOR A LENS BARREL

[75] Inventor: Takeshi Muryoi, Chigasaki, Japan

[73] Assignee: Nippon Kogaku K.K., Tokyo, Japan

[21] Appl. No.: 413,777

[22] Filed: Sep. 1, 1982

Related U.S. Application Data

[63] Continuation of Ser. No. 238,423, Feb. 26, 1981, abandoned.

[30] Foreign Application Priority Data

Mar. 6, 1980 [JP] Japan .................................. 55-28207

[51] Int. Cl.³ .............................................. G03B 9/02
[52] U.S. Cl. ................................................... 354/274
[58] Field of Search ........................ 354/270, 272, 274

[56] References Cited

U.S. PATENT DOCUMENTS

| | | | |
|---|---|---|---|
| 3,657,988 | 4/1972 | Mito ................................. | 354/270 |
| 3,765,315 | 10/1973 | Hokari ............................. | 354/272 |
| 3,827,064 | 7/1974 | Kiyohara et al. ................ | 354/272 |
| 3,940,781 | 2/1976 | Krause et al. ................... | 354/272 |

FOREIGN PATENT DOCUMENTS

| | | | |
|---|---|---|---|
| 1095109 | 12/1960 | Fed. Rep. of Germany ...... | 354/272 |
| 2115891 | 5/1979 | Fed. Rep. of Germany ...... | 354/272 |

*Primary Examiner*—Russell E. Adams
*Attorney, Agent, or Firm*—Fitzpatrick, Cella, Harper & Scinto

[57] ABSTRACT

In a diaphragm driving device of a lens barrel which is provided between a diaphragm driving ring and a cam member and which rotates the diaphragm driving ring correspondingly to a positional variation amount provided by the cam surface of the cam member during the stop-down operation by a diaphragm interlocking device provided on a camera body, there are provided a pivotable member and a limiting member. The pivotable member has a first arm coupled to the diaphragm driving ring and a second arm engageable with the diaphragm interlocking device of the camera body, and is pivotable with respect to an axis substantially orthogonal to an optical axis lying between the first and the second arm. The limiting member is provided between the cam surface and the second arm to limit the range of pivotal movement of the pivotable member.

4 Claims, 1 Drawing Figure

DIAPHRAGM DRIVING DEVICE FOR A LENS BARREL

This is a continuation of application Ser. No. 238,423, filed Feb. 26, 1981, now abandoned.

BACKGROUND OF THE INVENTION

1. Field of the Invention

This invention relates to a diaphragm driving device for the lens barrel of a camera, and more particularly to a diaphragm driving device suited for driving a diaphragm blade provided in a lens barrel having a relatively great barrel length.

2. Description of the Prior Art

In a lens barrel having an optical system providing a long focal length, the position of an iris diaphragm is generally remote from the imaging plane and thus, a diaphragm driving ring rotatable to provide diametral displacement to a diaphragm blade is disposed at a position remote from the mount portion for a camera.

As an automatic diaphragm mechanism for driving a diaphragm blade in response to the shutter release of a camera, there is one designed such that the movement range of a connecting lever positioned between the diaphragm interlocking device of the camera and diaphragm driving ring is limited by a cam member operatively associated with an aperture value setting operating ring rotatably provided around the outer periphery of a lens barrel, and if the automatic diaphragm mechanism of such construction is applied to a lens barrel having a relatively great barrel length, the member such as the connecting lever will necessarily become long and the construction and arrangement of the device must be improved upon to avoid occurrence of any operational error attributable to the elastic strain or the like of the material and the bulky size of the device.

SUMMARY OF THE INVENTION

The present invention particularly intends to provide an automatic diaphragm driving device suited for a lens barrel having a great barrel length.

In the device of the present invention, a cam member operatively associated with an aperture value setting operating ring is disposed near the mount for a camera body, and provision is made of a lever having at the respective opposite ends thereof a portion coupled to a diaphragm driving ring and a portion coupled to the diaphragm interlocking device of the camera, the lever being pivotable with respect to an axis substantially orthogonal to the optical axis, and a member disposed between said cam surface and said lever to limit the range of pivotal movement of the lever, the pivotable lever being displaced by the diaphragm interlocking device of the camera until it is limited by the limiting member, thereby obtaining a predetermined aperture value.

The invention will become more fully apparent from the following detailed description thereof taken in conjunction with the accompanying drawing.

BRIEF DESCRIPTION OF THE DRAWING

The drawing is a perspective view of the lens diaphragm device according to the present invention.

DESCRIPTION OF THE PREFERRED EMBODIMENTS

Figure 1:
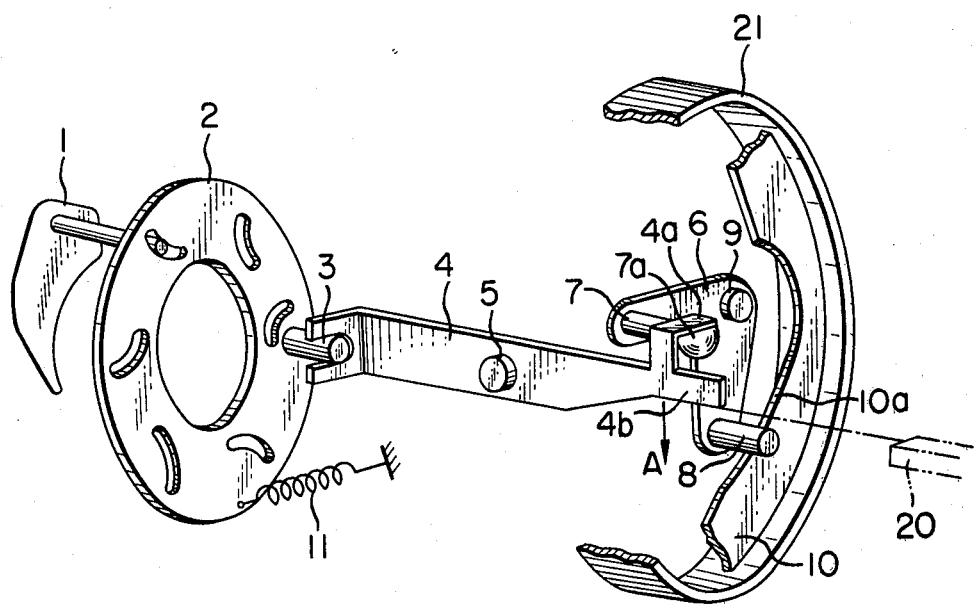

The drawing is a perspective view showing an embodiment of the present invention and illustrating the open aperture condition before shutter release. In the drawing, reference numeral 1 designates a diaphragm blade, and reference numeral 2 denotes a diaphragm blade driving ring rotatably provided near the central portion of a lens barrel and provided with a cam slot for displacing the diaphragm blade 1 during rotation thereof. Reference numeral 3 designates a pin integral with the driving ring 2, and reference numeral 4 denotes a lever pivotable about a shaft 5. One arm of the lever 4 is coupled to the pin 3 and the other arm thereof is formed with an end 4b engageable with the diaphragm interlocking lever 20 of the camera body and a bent portion 4a.

Inside of an aperture ring 21 for aperture value setting operation rotatably provided around the outer periphery of the lens barrel, a cam ring 10 is secured or provided in operative association therewith. When its operability is taken into account, the aperture ring 21 may preferably lie at a position near the mount portion of the camera body. For simplification of its structure, the cam ring 10 may preferably be provided near the aperture ring 21. The cam surface 10a of the cam ring 10 has a positional variation amount associated with the aperture value. A lever 6 has a pin 7 having a ball 7a formed at the end thereof for determining the stop position of the bent portion 4a and a pin 8 which is in contact with the cam ring 10, and is pivotally supported on the lens barrel by means of a rotary shaft 9. The driving ring 2 is biased in stop-down direction by a spring 11.

Now, when the aperture ring 21 is manually operated to rotate the cam ring 10 clockwisely as viewed in the drawing, there is formed a gap between the pin 8 and the cam surface 10a of the cam ring 10. However, the end 4b of the pivotable lever 4 is restrained in its shown position by the lever 20 of the camera body. When the lever 20 is retracted in the direction of arrow A upon shutter release by the operation of the diaphragm interlocking device of the camera body, the restraint of the lever end 4b is released and the driving ring 2 is rotated counter-clockwisely by the spring 11, so that the pivotable lever 4 pivots clockwisely. When the diaphragm blade 1 is stopped down to a predetermined aperture value, the pin 8 comes to bear against the cam surface 10a of the cam ring 10 and the driving ring 2 is stopped through the agency of the lever 6, the ball 7a, the bent portion 4a and the lever 4 and thus, the diaphragm blade 1 is stopped at that position. A predetermined diaphragm aperture is obtained in this manner. If the lever 20 of the camera body pushes up the end 4b after movement of the shutter curtain, the open aperture condition will be restored as shown. If the aperture ring 21 is again operated before shutter release, the angle through which the lever 6 is rotated during shutter release will be varied and a diaphragm aperture corresponding to the rotated position of the aperture ring will be obtained, of course. While it has been described that when the aperture ring 21 is rotated before shutter release, there is formed a gap between the pin 8 and the cam surface 10a of the cam ring 10, a gap may be formed between the ball 7a and the bent portion 4a. That is, a biasing member or the like may be provided to the lever 6 to ensure formation of a gap between the pin 8 and the cam surface 10a or between the ball 7a and the bent portion 4a.

In the present embodiment, the direction of rotation of the pivotable lever 4 and the direction of rotation of the lever 6 are made substantially orthogonal to each other to thereby simplify the construction of the device and moreover, prevent occurrence of any error attributable to the elastic strain of the material. The ball 7a provided in the portion of contact between the levers 4 and 6 is useful to prevent occurrence of any contact error by the two levers always making a point contact irrespective of the positional relation between the two levers.

While only one pivotable lever is used in the shown embodiment, the movement of the stop-down lever 20 may be transmitted to the diaphragm blade driving ring through a plurality of pivotable levers.

I claim:

1. In a diaphragm driving device for a lens barrel which is provided between a diaphragm driving ring having its aperture opening by a diaphragm blade variable by rotation thereof about the optical axis of an optical system and a cam member having, near a mount portion for a camera body, an aperture value adjusting cam surface displaceable in response to operation of an aperture value setting operating member and which regulates the rotation of said diaphragm driving ring in correspondence with a positional variation amount provided by said cam surface during the stop-down operation by a diaphragm interlocking device provided on said camera body, the improvement comprising:

(a) a pivotable member having a first arm coupled to said diaphragm driving ring and a second arm provided with a first portion engageable with the diaphragm interlocking device of said camera body and a second portion integrated with said first portion, said pivotable member being pivotable with respect to a fixed axis on said lens barrel, said axis being substantially orthogonal to said optical axis lying between said first and said second arm, said pivotable member being prevented from pivotally moving in one direction by the engagement with said diaphragm interlocking device and pivoting to said one direction in response to the stop-down operation by said diaphragm interlocking device;

(b) means for biasing said pivotable member in said one direction; and (c) a limiting member having a first portion engageable with said second portion of said second arm during said pivotal movement in said one direction and a second portion engageable with said cam surface and enabling said pivotal movement of said pivotable member in said one direction until both engagements of said first and second portions of said limiting member are accomplished.

2. A device according to claim 1, wherein said limiting member includes a lever pivotable with respect to an axis substantially parallel to said optical axis.

3. A device according to claim 2, wherein said first portion of said limiting member has a spherical surface.

4. A device according to claim 1, wherein said biasing means biases said diaphragm driving ring in stop-down direction, said pivotable member being biased by said biasing means through said diaphragm driving ring.

* * * * *